No. 666,092. Patented Jan. 15, 1901.
A. H. FOX.
MANUFACTURE OF BOLTS OR RIVETS.
(Application filed Aug. 1, 1900.)
(No Model.) 2 Sheets—Sheet 1.

WITNESSES:
James P. Barr.
Percival H. Granger.

INVENTOR
Adam H. Fox
BY
Chas. N. Butler
ATTORNEY

No. 666,092.  
Patented Jan. 15, 1901.

A. H. FOX.

MANUFACTURE OF BOLTS OR RIVETS.

(Application filed Aug. 1, 1900.)

(No Model.)  
2 Sheets—Sheet 2.

WITNESSES:  
James O. Barr  
Parcivale H. Granger.

INVENTOR  
Adam H. Fox  
BY  
Chas. N. Butler  
ATTORNEY

UNITED STATES PATENT OFFICE.

ADAM H. FOX, OF PHILADELPHIA, PENNSYLVANIA.

MANUFACTURE OF BOLTS OR RIVETS.

SPECIFICATION forming part of Letters Patent No. 666,092, dated January 15, 1901.

Application filed August 1, 1900. Serial No. 25,487. (No model.)

*To all whom it may concern:*

Be it known that I, ADAM H. FOX, residing at Philadelphia, (Wissahickon,) in the county of Philadelphia, State of Pennsylvania, have invented new and useful Improvements in the Manufacture of Bolts or Rivets, of which the following is a specification.

The primary purpose of this invention is to manufacture bolts, rivets, and similar articles so that their heads, of whatever shape, shall be formed centrally and symmetrically on the shank. In the operations usually employed the end of the bar from which the bolt or rivet head is formed is distorted by shearing off the preceding bolt or rivet and causes an unsymmetrical flow of metal in the process of heading, resulting in "flash" or a head unsymmetrical with respect to the shank. This defect is corrected by my invention through employing with the usual dies for shearing and forming the bolts or rivets means for preventing distortion and distributing the metal which forms the heads so that its flow in the operation of heading and the head formed shall be symmetrical.

Figure 1:
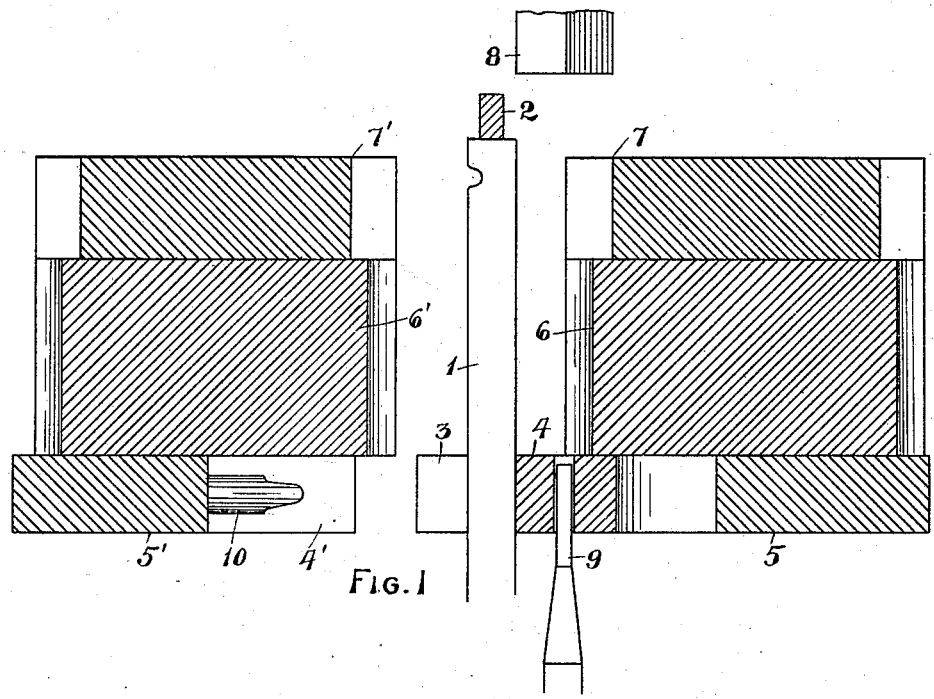
Figure 2:
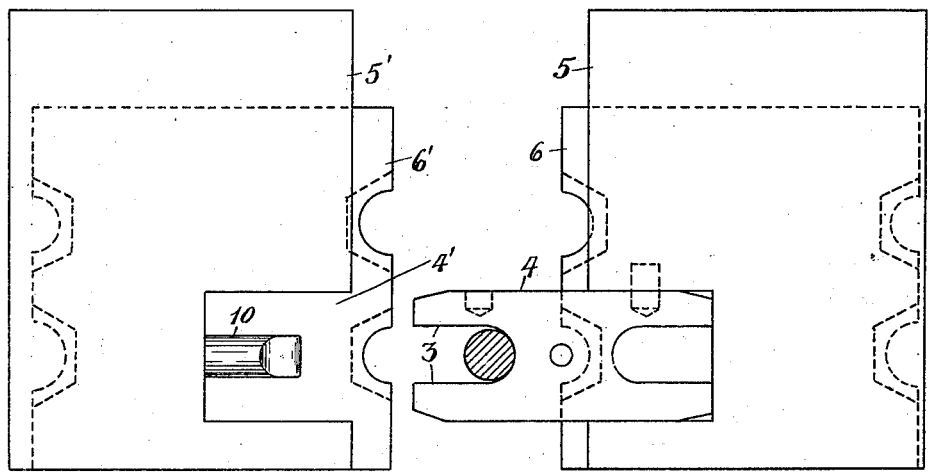
Figure 3:
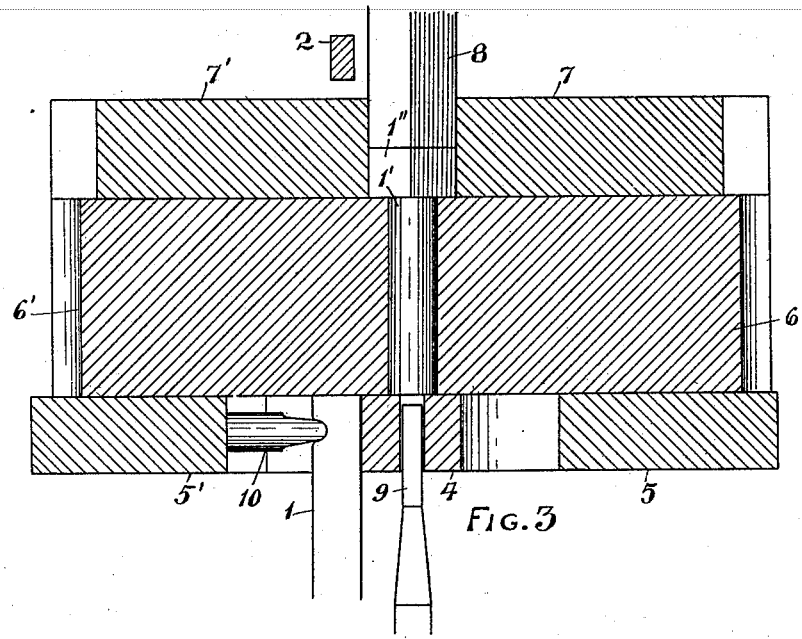
Figure 4:
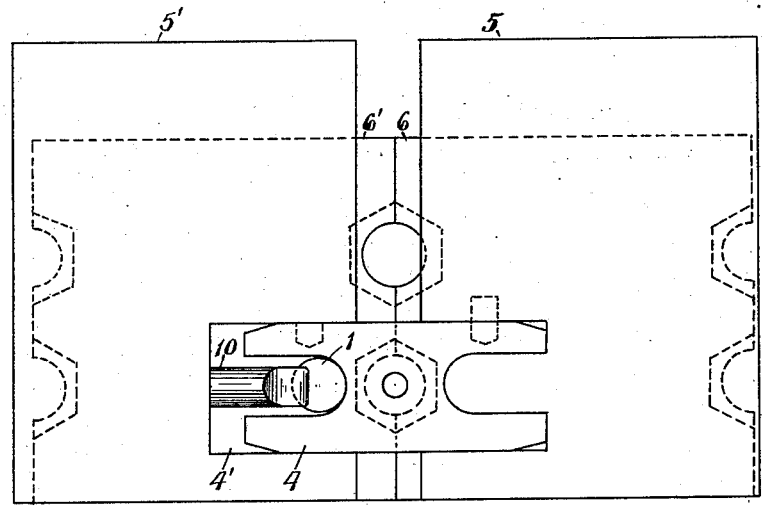

In the accompanying drawings, illustrating my invention, Figure 1 is a vertical sectional view through bolt or rivet forming mechanism employing my improvements, the parts being shown in open relation. Fig. 2 is a bottom plan view of the mechanism as illustrated in Fig. 1. Fig. 3 is a vertical sectional view of the same mechanism in closed relation. Fig. 4 is a bottom plan view of the mechanism as illustrated in Fig. 3.

As shown in the accompanying drawings, the bar 1 after being heated is thrust into the machine until it strikes the gage or stop 2, which limits the length to be shorn off for forming the rivet or bolt with a head of the size desired. The bar 1 being in the jaw 3 of the knife 4, which is secured by the holder 5 beneath the fixed die-block 6, the movable die-block 6' is brought up by a stroke of the machine which operates it, the bar 1 is shorn by the knife 4 and the die-block 6', and the section is carried from the position shown in Fig. 1 to that shown in Fig. 3. The closed die-blocks 6 and 6' form the shank 1', and the closed die-blocks 7 and 7', together with the header 8, form the head 1", the bolt or rivet being kicked out by the kicker 9 when the header 8 and the die 9' are withdrawn.

The foregoing construction and operation, commonly employed, bend or distort the metal of the shorn end of the bar 1, from which the head is to be formed. To correct this distortion, so as to secure the equal flow of metal desired for forming a head without flash, I employ a "gag" or straightener 10, carried by the holder 5' beneath the die-block 6' and placed in the notch 4', which receives the knife 4. This device 10 impinges against the shorn end of the heated bar 1, pressing and straightening the same, the metal being distributed so that in the heading operation the flow is symmetrical and the head is formed centrally with respect to the shank.

It will be evident that the shearing and straightening mechanism described may be usefully employed in other relations than that of forming bolts and rivets, as wherever it is desired to shear and straighten the shorn ends of bars, rods, or shapes.

Having thus described my invention, I claim—

1. In the manufacture of bolts, rivets and the like, the combination of shearing mechanism with a straightener which impinges against the material shorn, for the purpose specified.

2. In the manufacture of bolts, rivets and the like, the combination of shearing mechanism with mechanism which distributes the metal for forming the head so that its flow in the operation of heading and the head formed thereby shall be symmetrical with respect to the shank, substantially as specified.

3. In the manufacture of bolts, rivets and the like, the combination of a knife which shears the rod from which the bolts or rivets are formed with a gag or straightener which impinges against the shorn end of said rod, for the purpose set forth.

4. In the manufacture of bolts, rivets and the like, the combination of mechanism for shaping said bolts or rivets, with a knife and holder for shearing said bolts or rivets, and a straightener and holder for straightening and distributing the metal at the shorn ends of said rod, for the purpose set forth, substantially as specified.

In testimony whereof I have hereunto set my hand, in the presence of the subscribing witnesses, this 31st day of July, 1900.

ADAM H. FOX.

Witnesses:
   THOMAS S. GATES,
   CHARLES N. BUTLER.